US009676578B2

(12) United States Patent
Onodera et al.

(10) Patent No.: US 9,676,578 B2
(45) Date of Patent: Jun. 13, 2017

(54) ROLLER-TO-ROLLER CONVEYANCE CONTROL APPARATUS

(71) Applicant: Mitsubishi Electric Corporation, Tokyo (JP)

(72) Inventors: Yasuo Onodera, Tokyo (JP); Tsutomu Yamamoto, Tokyo (JP); Masaya Kimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/112,236

(22) PCT Filed: Nov. 27, 2014

(86) PCT No.: PCT/JP2014/081456
§ 371 (c)(1),
(2) Date: Jul. 18, 2016

(87) PCT Pub. No.: WO2016/084206
PCT Pub. Date: Jun. 2, 2016

(65) Prior Publication Data
US 2016/0340140 A1 Nov. 24, 2016

(51) Int. Cl.
*B65H 23/185* (2006.01)
*B65H 23/18* (2006.01)
(Continued)

(52) U.S. Cl.
CPC ....... *B65H 23/1806* (2013.01); *B65H 23/185* (2013.01); *B65H 23/198* (2013.01);
(Continued)

(58) Field of Classification Search
CPC B65H 23/185; B65H 23/198; B65H 23/1806; G05B 13/02
See application file for complete search history.

(56) References Cited

U.S. PATENT DOCUMENTS 3,829,745 A * 8/1974 Ha .................. G11B 15/54
361/246
4,977,466 A 12/1990 Nakata
(Continued)

FOREIGN PATENT DOCUMENTS

JP 61-094115 A 5/1986
JP 63-35102 U 3/1988
(Continued)

OTHER PUBLICATIONS

Notice of Reasons for Rejection of Japanese Application No. 2015-545588 dated Oct. 28, 2015.
(Continued)

*Primary Examiner* — Sang Kim
(74) *Attorney, Agent, or Firm* — Sughrue Mion, PLLC; Richard C. Turner

(57) ABSTRACT

The roller-to-roller conveyance control apparatus includes an amplitude target setting unit that sets an amplitude target value of the tension deviation; an adjustment execution command generation unit that provides a command to adjust the control gain; an adjustment manipulated-variable output unit that outputs an adjustment manipulated variable; a manipulated-variable amplitude determination unit that increases the amplitude of the adjustment manipulated variable until the amplitude of the tension deviation becomes larger than the amplitude target value; and a control-gain calculation device that calculates the control gain from the amplitude and the vibration period of the tension deviation. A tension-shaft speed controller controls a tension-control-shaft motor on the basis of the line speed reference and the adjustment manipulated variable during the adjustment of the control gain.

7 Claims, 9 Drawing Sheets

(51) Int. Cl.
*G05B 13/02* (2006.01)
*B65H 23/198* (2006.01)

(52) U.S. Cl.
CPC .......... *G05B 13/02* (2013.01); *B65H 2513/11* (2013.01); *B65H 2515/31* (2013.01); *B65H 2557/264* (2013.01)

(56) References Cited

U.S. PATENT DOCUMENTS 6,874,723 B2 * 4/2005 Ueyama ............... B65H 18/103
                                                     242/413.9
2016/0318726 A1 * 11/2016 Ikeda ................... B65H 18/145

FOREIGN PATENT DOCUMENTS

| | | |
|---|---|---|
| JP | 02-095657 A | 4/1990 |
| JP | 03-216206 A | 9/1991 |
| JP | 08-052506 A | 2/1996 |
| JP | 10-250888 A | 9/1998 |
| JP | 2011-183428 A | 9/2011 |
| WO | 2015/093211 A1 | 6/2015 |

OTHER PUBLICATIONS

Notice of Allowance of Japanese Application No. 2015-545588 dated Jan. 8, 2016.
International Search Report of PCT/JP2014/081456 dated Feb. 10, 2015 [PCT/ISA/210].

\* cited by examiner

ROLLER-TO-ROLLER CONVEYANCE CONTROL APPARATUS

CROSS REFERENCE TO RELATED APPLICATIONS

This application is a National Stage of International Application No. PCT/JP2014/081456, filed Nov. 27, 2014, the contents of which are incorporated herein by reference in its entirety.

FIELD

The present invention relates to a roller-to-roller conveyance control apparatus that conveys a conveyed material, which is made from a raw material, such as metal, resin, or paper, formed in a belt-like or line-like shape, while the material is extended under tension between rollers that are individually driven by motors.

BACKGROUND

To convey a conveyed material stably in such a manner that the material disposed between two rollers is under a predetermined tension, a roller-to-roller conveyance control apparatus includes speed controllers that each control the rotational speed of a corresponding roller, and provides speed references corresponding to the line speed to the speed controllers. At the same time, a tension detector detects the tension of the conveyed material between the two rollers, and a tension controller, which performs PI (Proportional-Integral) control or PID (Proportional-Integral-Derivative) control such that the tension of the conveyed material agrees with a command value, calculates a compensation value and outputs a tension control correction command to the tension control shaft, which is one of the shafts of the two rollers, as an addition to the speed reference described above.

Here, it is necessary to set the PI control gain for the tension controller appropriately in order for such a roller-to-roller conveyance control apparatus to convey a conveyed material stably. While the roller-to-roller conveyance control apparatus performs roller-to-roller conveyance, an operator checks the change in control gain and the corresponding tension response to adjust the control gain on a trial-and-error basis.

Common types of roller-to-roller conveyance control apparatus often cannot even convey a conveyed material with the desired conveying conditions unless the control gain for the tension controller is set to an appropriate value. Hence, in the initial adjustment stage, it is necessary to check the response of the detected tension value under operating conditions different from those of a normal operation, such as gentle acceleration/deceleration and a low speed, to make an adjustment to obtain a control gain with which stable conveyance can be achieved. It is then further necessary to repeat an operation of checking the response of the detected tension value under operating conditions closer to those of the normal operation to adjust the control gain such that the tension is further stabilized. This means that, because the adjustment of the control gain for a tension controller in a roller-to-roller conveyance control apparatus requires repeated changing of both operating conditions and control gains on a trial-and-error basis, it takes a significantly long time and much effort.

A solution to the problem described above is a technique disclosed in Patent Literature 1 that includes a model identification unit and identifies a control target model of a tension control system; the technique then uses the control target model in the repetition of a simulation and evaluation of the response when the control gain is changed to a candidate value in order to search for an optimal value of the control gain using a genetic algorithm and thereby automatically adjust the control gain of a tension control calculation unit.

CITATION LIST

Patent Literature

Patent Literature 1: Japanese Patent Application Laid-Open No. H10-250888

SUMMARY

Technical Problem

To calculate an appropriate control gain, an adjustment manipulated-variable amplitude needs to be set appropriately. The adjustment manipulated-variable amplitude is the amplitude of an adjustment manipulated variable, which generates a periodic vibration in tension. If the adjustment manipulated-variable amplitude is small, the tension periodic vibration amplitude, which is the amplitude of a periodic vibration in tension, becomes small, which results in the tension periodic vibration amplitude being buried in the noise of the tension detector and therefore hinders the calculation of an appropriate control gain. If the adjustment manipulated-variable amplitude is large, there is a risk that a conveyed material ruptures and the apparatus is overloaded.

Additionally, when the adjustment manipulated-variable amplitude is increased, depending on the method to increase the adjustment manipulated-variable amplitude, the tension periodic vibration amplitude that has been set may not be achieved even after a long period of time, which results in a failure to complete the automatic adjustment, or the tension periodic vibration amplitude may become too large, which leads to rupture of a conveyed material or an overload on the apparatus.

The present invention has been achieved in view of the above, and an object of the present invention is to provide a roller-to-roller conveyance control apparatus that sets an appropriate adjustment manipulated-variable amplitude and automates the adjustment of the control gain.

Solution to Problem

In order to solve the above problems and achieve the object, an aspect of the present invention is a roller-to-roller conveyance control apparatus that comprises: a speed-shaft roller that is driven by a speed-control-shaft motor; a tension-shaft roller that is driven by a tension-control-shaft motor; a tension detector that detects a tension of a conveyed material that is conveyed between the speed-shaft roller and the tension-shaft roller; a line-speed reference setting unit that sets a line speed reference for the conveyed material; a tension-command setting unit that sets a tension command for the conveyed material; a tension controller that calculates a tension control correction command on a basis of a control gain and a tension deviation that is a difference between the tension command and the tension; a speed-shaft speed controller that controls the speed-control-shaft motor on a basis of the line speed reference; and a tension-shaft speed controller that controls the tension-control-shaft motor on a basis of the line speed reference and the tension control correction command, the roller-to-roller conveyance control apparatus comprises: an amplitude target setting unit that sets an amplitude target value of the tension deviation; an adjustment execution command generation unit that provides a command to adjust or not to adjust the control gain; an adjustment manipulated-variable output unit that outputs an adjustment manipulated variable on a basis of the tension deviation during adjustment of the control gain; a manipulated-variable amplitude determination unit that increases an amplitude of the adjustment manipulated variable until an amplitude of the tension deviation becomes larger than the amplitude target value during adjustment of the control gain; and a control-gain calculation device that calculates the control gain from the amplitude and a vibration period of the tension deviation during adjustment of the control gain, wherein the tension-shaft speed controller controls the tension-control-shaft motor on a basis of the line speed reference and the adjustment manipulated variable during adjustment of the control gain.

Advantageous Effects of Invention

A roller-to-roller conveyance control apparatus according to the present invention produces effects of setting an appropriate adjustment manipulated-variable amplitude and automates the adjustment of the control gain.

DESCRIPTION OF EMBODIMENTS

A roller-to-roller conveyance control apparatus according to embodiments of the present invention will be described below in detail with reference to the drawings. The present invention is not limited to the embodiments.

First Embodiment

Figure 1:
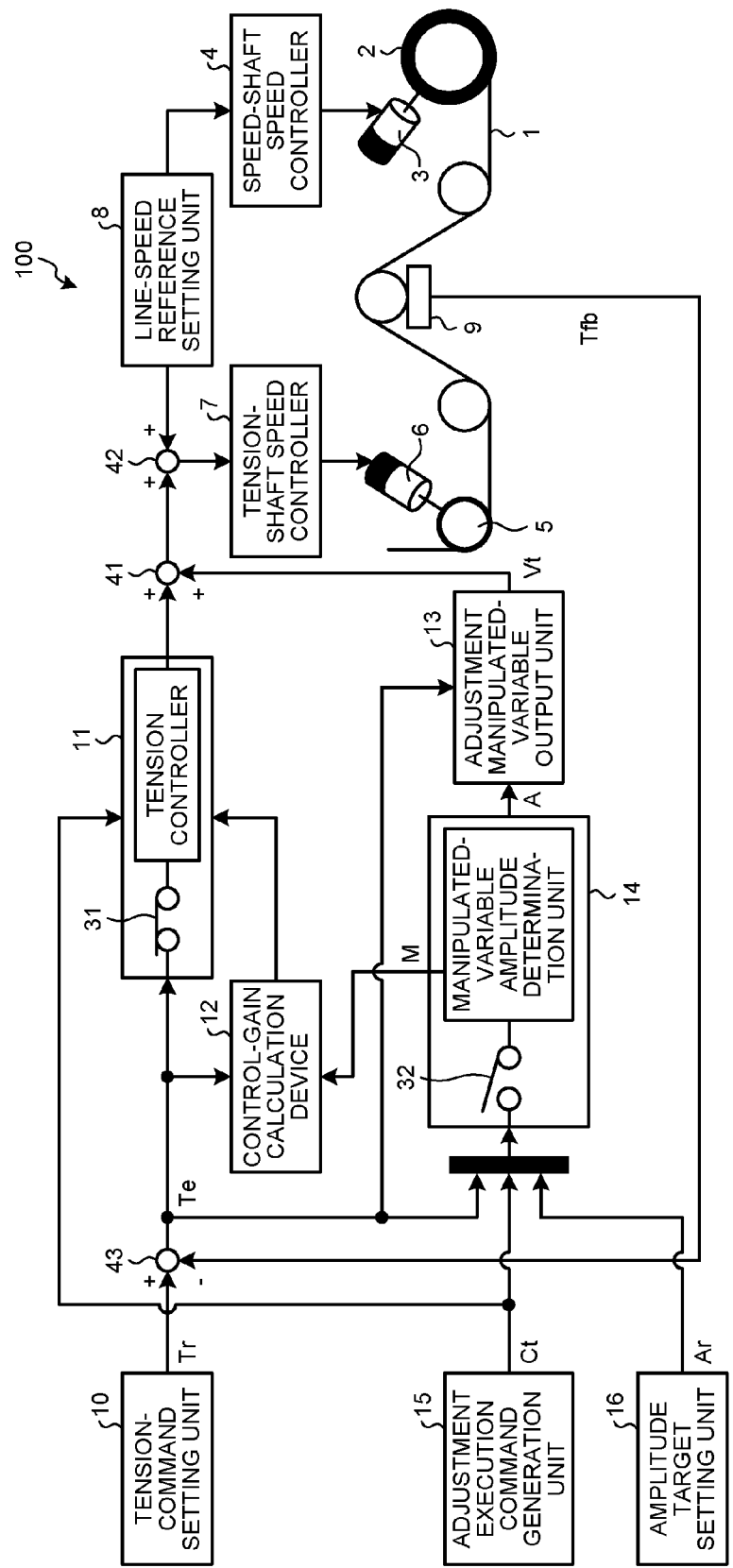
FIG. 1 is a block diagram illustrating an entire view of a roller-to-roller conveyance control apparatus according to first and second embodiments of the present invention.

FIG. 1 is a block diagram illustrating an entire view of a roller-to-roller conveyance control apparatus 100 according to a first embodiment of the present invention. The roller-to-roller conveyance control apparatus 100 conveys a conveyed material 1, which is made from a raw material, such as metal, resin, or paper, and is formed in a belt-like or line-like shape. The roller-to-roller conveyance control apparatus 100 includes a winding roller 2, which winds up the conveyed material 1; a winding motor 3, which drives the winding roller 2; a speed-shaft speed controller 4, which controls the rotational speed of the winding motor 3 such that the conveyed material 1 is wound up at a predetermined line speed; an unwinding roller 5, which unwinds the conveyed material 1; an unwinding motor 6, which drives the unwinding roller 5; a tension-shaft speed controller 7, which controls the rotational speed of the unwinding motor 6 such that the conveyed material 1 is unwound at a predetermined line speed; a line-speed reference setting unit 8, which sets a line speed reference for the conveyed material 1; a tension detector 9, which is disposed between the winding roller 2 and the unwinding roller 5 and detects a tension Tfb of the conveyed material 1; a tension-command setting unit 10, which sets a tension command Tr for the conveyed material 1; and a tension controller 11, which outputs a tension control correction command for correcting the speed reference to the tension-shaft speed controller 7 such that the tension of the conveyed material 1 agrees with the tension command Tr. This enables the conveyed material 1 to be conveyed at a predetermined speed and under a predetermined tension.

The roller-to-roller conveyance control apparatus 100 further includes a control-gain calculation device 12, which calculates an appropriate control gain for the tension controller 11; an adjustment manipulated-variable output unit 13, which outputs an adjustment manipulated variable Vt for the tension-shaft speed controller 7 during control gain adjustment; a manipulated-variable amplitude determination unit 14, which determines an adjustment manipulated-variable amplitude A to be used during the adjustment; an adjustment execution command generation unit 15, which generates an adjustment execution command Ct and provides a command to execute the adjustment of the control gain; an amplitude target setting unit 16, which sets an amplitude target value Ar of a tension periodic vibration for the calculation of the control gain; adders 41 and 42; and a subtracter 43. Note that Ar is a positive value.

The tension controller 11 includes a switch 31 and outputs the tension control correction command when the switch 31 is on. When the switch 31 is off, the tension controller 11 outputs no tension control correction command, causing its output to be zero. The manipulated-variable amplitude determination unit 14 includes a switch 32 and outputs the adjustment manipulated-variable amplitude A when the switch 32 is on. When the switch 32 is off, the manipulated-variable amplitude determination unit 14 outputs no adjustment manipulated-variable amplitude A, causing its output to be zero. Since the output of the manipulated-variable amplitude determination unit 14 is zero when the switch 32 is off, the adjustment manipulated variable Vt, which is the output of the adjustment manipulated-variable output unit 13, is also zero. The output of the tension controller 11 and the output of the adjustment manipulated-variable output unit 13 are added by the adder 41 and the result is input to the adder 42.

Before the execution of the adjustment of the control gain, the adjustment execution command Ct is off, and the switches 31 and 32 are also both off. Subsequently, the adjustment execution command Ct is turned on to start the adjustment of the control gain. During the execution of the adjustment, the switch 31 is off and the switch 32 is on. Thus, the output of the adder 41 is the adjustment manipulated variable Vt during the control gain adjustment. When the adjustment execution command Ct is turned off to end the adjustment of the control gain, the switch 31 is turned on and the switch 32 is turned off; therefore, the output of the adder 41 is the tension control correction command from the tension controller 11. Hence, after the start of the adjustment of the control gain, the adder 42 adds the tension control correction command or the adjustment manipulated variable Vt to the line speed reference, which is the output of the line-speed reference setting unit 8, and outputs the result to the tension-shaft speed controller 7. That is, during control gain adjustment, the sum of the line speed reference and the adjustment manipulated variable Vt is input to the tension-shaft speed controller 7 and, after the control gain adjustment, the sum of the line speed reference and the tension control correction command is input to the tension-shaft speed controller 7.

Figure 2:
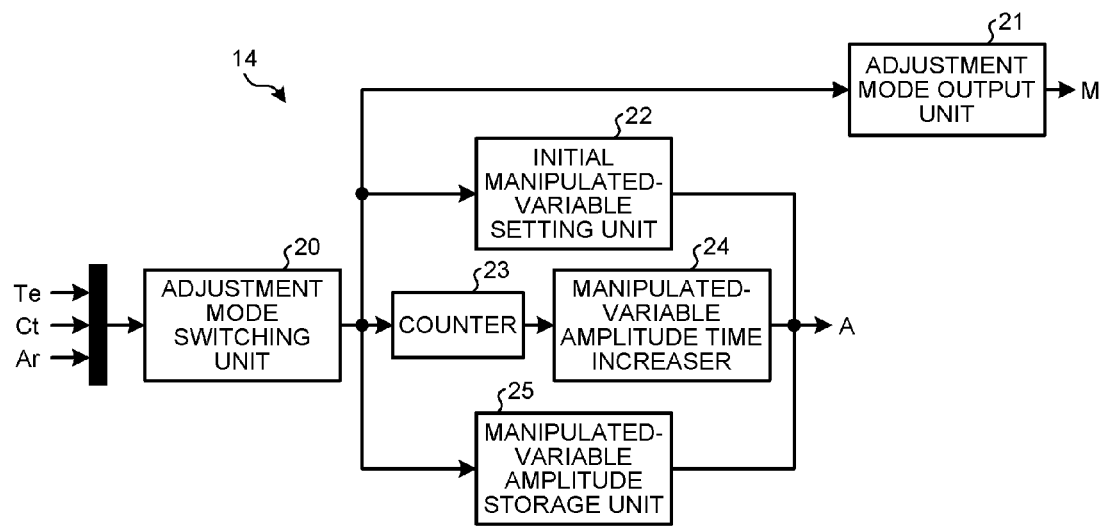
FIG. 2 is a block diagram of a manipulated-variable amplitude determination unit according to the first embodiment.

FIG. 2 is a block diagram illustrating the manipulated-variable amplitude determination unit 14 according to the first embodiment in detail. The manipulated-variable amplitude determination unit 14 according to the first embodiment includes an adjustment mode switching unit 20, which switches an adjustment mode M; an adjustment mode output unit 21, which outputs the adjustment mode M set by the adjustment mode switching unit 20 to the control-gain calculation device 12; an initial manipulated-variable setting unit 22, which sets an initial value of the adjustment manipulated-variable amplitude A; a counter 23, which counts an elapsed time; a manipulated-variable amplitude time increaser 24, which increases the adjustment manipulated-variable amplitude A in accordance with a counter value of the counter 23; and a manipulated-variable amplitude storage unit 25, which stores the adjustment manipulated-variable amplitude A. The initial manipulated-variable setting unit 22, the manipulated-variable amplitude time increaser 24, and the manipulated-variable amplitude storage unit 25 each output the adjustment manipulated-variable amplitude A, which is input to the adjustment manipulated-variable output unit 13.

The operation of the roller-to-roller conveyance control apparatus 100 according to the first embodiment will now be described with reference to FIG. 1. As illustrated in FIG. 1, the conveyed material 1 is conveyed while it is extended between the winding roller 2 and the unwinding roller 5 under a predetermined tension. The line speed for the conveyed material 1 is set by the line-speed reference setting unit 8. The line speed reference set by the line-speed reference setting unit 8 is sent out to the speed-shaft speed controller 4 and the tension-shaft speed controller 7.

The speed-shaft speed controller 4 controls the winding motor 3 such that the line speed of the conveyed material 1 is in accordance with the line speed reference set by the line-speed reference setting unit 8. Specifically, the speed-shaft speed controller 4 converts the line speed reference to a converted speed reference that corresponds to the rotational speed of the winding motor 3 with consideration given to the diameter and the reduction ratio of the winding roller 2 and performs the control such that the rotational speed of the winding motor 3 is in accordance with the converted speed reference. The winding roller 2 is driven by the winding motor 3 to wind up a certain amount of the conveyed material 1 per unit time.

The tension detector 9, which is disposed between the winding roller 2 and the unwinding roller 5, detects the tension Tfb of the conveyed material 1. The tension-command setting unit 10 sets the tension command Tr for the conveyed material 1. When the adjustment execution command Ct generated by the adjustment execution command generation unit 15 is off, the tension controller 11 obtains the tension control correction command, which is the sum of a proportional compensation resulting from multiplication of a tension deviation Te by a proportional gain, and an integral compensation resulting from multiplication of the tension deviation Te by an integral gain and integrating the result; where the tension deviation Te is the difference between the tension Tfb of the conveyed material 1 output by the tension detector 9 and the tension command Tr set by the tension-command setting unit 10. The tension controller 11 sends out the tension control correction command obtained in the manner described above for the tension-shaft speed controller 7. The tension deviation Te is obtained at the subtracter 43 by subtracting the tension Tfb from the tension command Tr.

The line-speed reference setting unit 8 sends out the line speed reference to the speed-shaft speed controller 4 and also sends out the line speed reference to the tension-shaft speed controller 7 at the same time in synchronization. The tension-shaft speed controller 7 receives the tension control correction command from the tension controller 11 in addition to the line speed reference from the line-speed reference setting unit 8; the tension-shaft speed controller 7 controls the unwinding motor 6 such that the unwinding motor 6 follows a command resulting from addition of the line speed reference to the tension control correction command by the adder 42. Specifically, the tension-shaft speed controller 7 converts the command resulting from the addition of the line speed reference to the tension control correction command to a converted speed reference that corresponds to the rotational speed of the unwinding motor 6 with consideration given to the diameter and the reduction ratio of the unwinding roller 5 and performs the control such that the rotational speed of the unwinding motor 6 is in accordance with the converted speed reference. The unwinding roller 5 is driven by the unwinding motor 6 to unwind a certain amount of the conveyed material 1 per unit time and thereby extends the conveyed material 1 under tension.

It is assumed here that the winding roller 2 is a speed-shaft roller, the winding motor 3 is a speed-control-shaft motor, the unwinding roller 5 is a tension-shaft roller, and the unwinding motor 6 is a tension-control-shaft motor, although the winding roller 2 may be a tension-shaft roller and the unwinding roller 5 may be a speed-shaft roller. Alternatively, the speed-shaft roller and the tension-shaft roller may be intermediate-shaft rollers that perform only the feeding actions between the unwinding roller 5 and the winding roller 2.

The adjustment execution command generation unit 15 turns on the adjustment execution command Ct on the basis of an external instruction, such as operation by an operator. As described above, the tension controller 11 outputs the tension control correction command when the adjustment execution command Ct is off.

When the adjustment execution command Ct is on, the manipulated-variable amplitude determination unit 14 determines the adjustment manipulated-variable amplitude A on the basis of the tension deviation Te as described below and sends out the adjustment manipulated-variable amplitude A to the adjustment manipulated-variable output unit 13. The manipulated-variable amplitude determination unit 14 also sends out the adjustment mode M to the control-gain calculation device 12.

Figure 3:
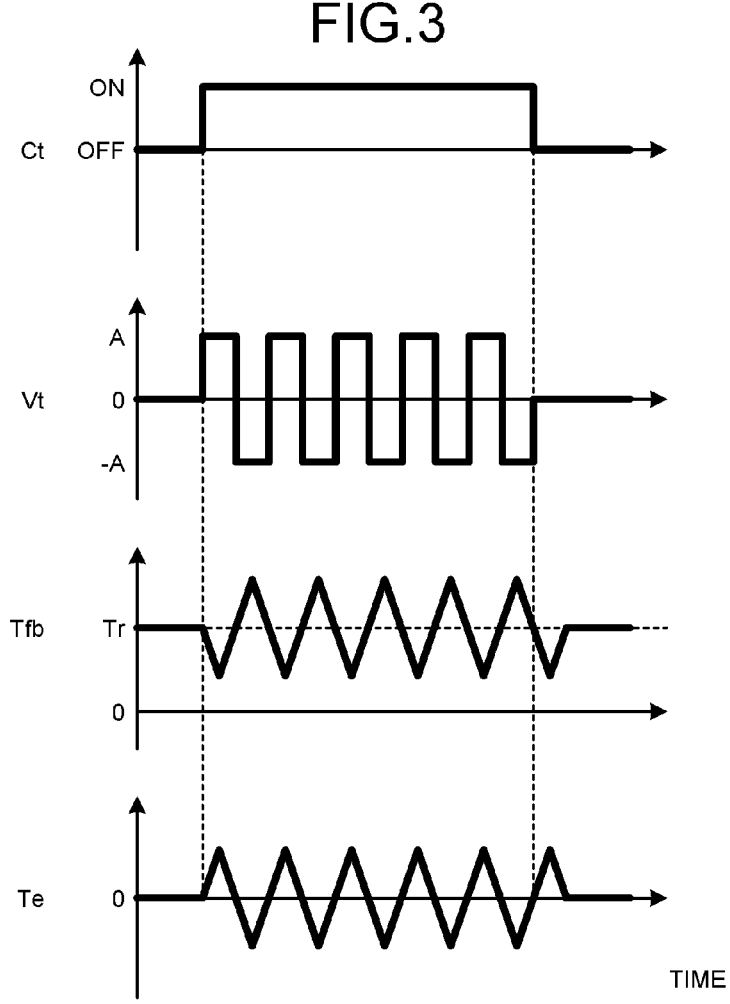
FIG. 3 is a diagram illustrating the behavior of an adjustment execution command Ct, an adjustment manipulated variable Vt, a tension Tfb, and a tension deviation Te, with an adjustment manipulated-variable amplitude A fixed to a constant value in the first embodiment.

The adjustment manipulated-variable output unit 13 outputs the adjustment manipulated variable Vt on the basis of the adjustment manipulated-variable amplitude A received from the manipulated-variable amplitude determination unit 14 and the tension deviation Te output by the subtracter 43. FIG. 3 is a diagram illustrating the behavior of the adjustment execution command Ct, the adjustment manipulated variable Vt, the tension Tfb, and the tension deviation Te, with the adjustment manipulated-variable amplitude A fixed to a constant value. A value of the tension command Tr is indicated in the graph of the tension Tfb and subtracting the tension Tfb from the tension command Tr produces a value of the tension deviation Te.

Assuming that the adjustment manipulated-variable amplitude A determined by the manipulated-variable amplitude determination unit 14 is appropriate, the adjustment manipulated variable Vt is generated in a manner described below. When the adjustment execution command Ct is turned on, the adjustment manipulated-variable output unit 13 outputs to the adder 41 the adjustment manipulated variable Vt, which is a value of A or −A, whichever works to reduce the tension deviation Te in accordance with the sign of the tension deviation Te. As described above, during the control gain adjustment, the adjustment manipulated variable Vt is input to the adder 42 as it is. By switching the sign of the adjustment manipulated variable Vt, the tension deviation Te vibrates periodically. The tension deviation Te includes a noise component; thus, switching the sign of the adjustment manipulated variable Vt in accordance with the plus and the minus of the tension deviation Te causes the adjustment manipulated variable Vt to chatter. Hence, the sign of the adjustment manipulated variable Vt should be determined by applying a low-pass filter to the tension deviation Te or on the basis of a signal of the tension deviation Te with hysteresis added thereto.

The control-gain calculation device 12 calculates a proportional gain and an integral gain that are control gains of the tension controller 11 on the basis of the tension deviation Te output by the subtracter 43 and the adjustment mode M output by the manipulated-variable amplitude determination unit 14. When the adjustment mode M transitions to a mode 4, which is the mode to calculate the control gains as described below, the control-gain calculation device 12 measures the amplitude and the vibration period of the tension deviation Te. The measurement of the amplitude and the vibration period is continued until the tension deviation Te has vibrated a predetermined number of times.

Upon completion of the measurement of the amplitude and the vibration period of the tension deviation Te, the control-gain calculation device 12 calculates the proportional gain for the tension controller 11, which is a value resulting from multiplication of the inverse number of the measured amplitude by a predetermined constant. The control-gain calculation device 12 also calculates the integral gain for the tension controller 11, which is a value resulting from division of the proportional gain by an integral time that is a value resulting from multiplication of the measured vibration period by a predetermined constant.

A specific method to calculate the proportional gain and the integral gain may be, for example, to calculate the proportional gain and the integral gain on the basis of the Ziegler-Nichols' closed loop method. The control gains calculated here are applied as the control gains for the tension controller 11 to achieve the tension control corresponding to the characteristics of the roller-to-roller conveyance control apparatus 100 and the conveyed material 1.

Figure 4:
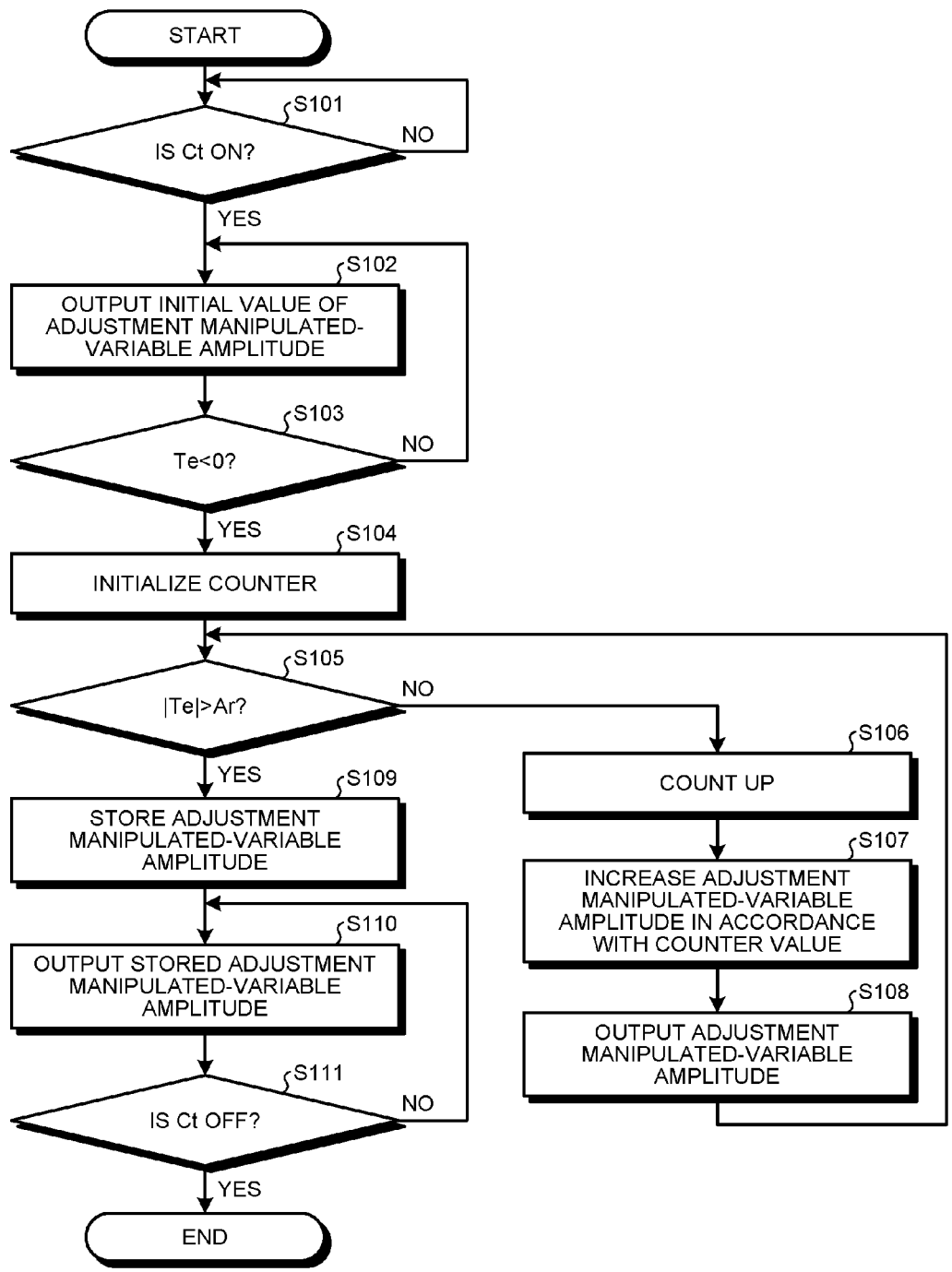
FIG. 4 is a flowchart illustrating a procedure to increase the adjustment manipulated-variable amplitude A according to the first embodiment.

The operation of the manipulated-variable amplitude determination unit 14 according to the first embodiment will now be described in detail with reference to FIGS. 1, 2, and 4. FIG. 4 is a flowchart illustrating a procedure to increase the adjustment manipulated-variable amplitude A according to the first embodiment.

The amplitude target setting unit 16 in FIG. 1 sets the amplitude target value Ar of the tension periodic vibration for the calculation of the control gains. The adjustment mode switching unit 20 in FIG. 2 receives the adjustment execution command Ct, the amplitude target value Ar, and the tension deviation Te.

With reference to FIG. 4, in step S101, the adjustment mode switching unit 20 in FIG. 2 determines whether or not the adjustment execution command Ct is on. If it is determined that the adjustment execution command Ct is on (step S101: Yes), the adjustment mode switching unit 20 sets a mode 1 in the adjustment mode output unit 21; the flowchart proceeds to step S102. The mode 1 is a mode in which an initial value is used as the adjustment manipulated-variable amplitude A. If the adjustment execution command Ct is not on (step S101: No), the determination in step S101 is performed again.

In step S102, the adjustment mode switching unit 20 selects the initial manipulated-variable setting unit 22. The initial manipulated-variable setting unit 22 outputs, as the adjustment manipulated-variable amplitude A, an initial value that has been set for the adjustment manipulated-variable amplitude to the adjustment manipulated-variable output unit 13. Here, at the time of initial adjustment, the characteristics of the roller-to-roller conveyance control apparatus 100 are unknown; thus, an adjustment manipulated-variable amplitude that causes the motor to operate at a low speed is set in the initial manipulated-variable setting unit 22 as the initial value. This can prevent rupture of the conveyed material 1 and an overload on the machine.

After step S102, the flowchart proceeds to step S103. In step S103, the adjustment mode switching unit 20 determines whether or not the tension deviation Te is a negative value. If the tension deviation Te is a negative value (step S103: Yes), the adjustment mode switching unit 20 sets a mode 2 in the adjustment mode output unit 21; the flowchart proceeds to step S104. The mode 2 is a mode in which the adjustment manipulated-variable amplitude A is increased in accordance with the elapsed time. If the tension deviation Te is not a negative value (step S103: No), the flowchart reverts back to step S102.

In step S104, the adjustment mode switching unit 20 initializes the counter 23. After step S104, the flowchart proceeds to step S105. In step S105, the adjustment mode switching unit 20 determines whether or not the absolute value of the tension deviation Te is larger than the amplitude target value Ar set by the amplitude target setting unit 16. If the absolute value of the tension deviation Te is larger than the amplitude target value Ar (step S105: Yes), the adjustment mode switching unit 20 sets the mode 4 in the adjustment mode output unit 21; the flowchart proceeds to step S109. If the absolute value of the tension deviation Te is smaller than the amplitude target value Ar (step S105: No), the flowchart proceeds to step S106.

In step S106, the adjustment mode switching unit 20 selects the counter 23, and the counter 23 counts up in accordance with the elapsed time. In step S107, which is after step S106, the manipulated-variable amplitude time increaser 24 increases the adjustment manipulated-variable amplitude A in accordance with a counter value of the counter 23. A specific method to increase the adjustment manipulated-variable amplitude A may be to have an amount of increase of the amplitude or a rate of increase of the amplitude, which is in either case predetermined per unit time, and to determine the adjustment manipulated-variable amplitude A on the basis of the amount of increase of the amplitude or the rate of increase of the amplitude, whichever has been predetermined, in accordance with the elapsed time counted by the counter 23. In step S108, which is after step S107, the manipulated-variable amplitude time increaser 24 outputs the adjustment manipulated-variable amplitude A to the adjustment manipulated-variable output unit 13; the flowchart reverts back to step S105.

In step S109, the adjustment mode switching unit 20 selects the manipulated-variable amplitude storage unit 25, and the manipulated-variable amplitude storage unit 25 stores an adjustment manipulated-variable amplitude that causes the absolute value of the tension deviation Te to become larger than the amplitude target value Ar for the first time. In step S110, which is after step S109, the manipulated-variable amplitude storage unit 25 outputs the stored adjustment manipulated-variable amplitude A to the adjustment manipulated-variable output unit 13.

The adjustment mode output unit 21 sends out the adjustment mode M that the adjustment mode switching unit 20 has switched to the control-gain calculation device 12. As described above, if the absolute value of the tension deviation Te is larger than the amplitude target value Ar (step S105: Yes), the adjustment mode M is switched to the mode 4; thus, the control-gain calculation device 12 determines that the mode in which the control gains are calculated is present and starts measuring the amplitude and the vibration period of the tension deviation Te in order to calculate the control gains. Upon completion of the measurement of the amplitude and the vibration period of the tension deviation Te, the control-gain calculation device 12 calculates the control gains with the amplitude and the vibration period that have been measured. When the control-gain calculation device 12 completes the calculation of the control gains after the measurement, which continues until the tension deviation Te has vibrated the predetermined number of times, the adjustment execution command Ct is turned off. The operation of the control-gain calculation device 12 described here is separate from that of the manipulated-variable amplitude determination unit 14 and thus is not described in the flowchart in FIG. 4.

After step S110 in FIG. 4, the flowchart proceeds to step S111, in which the adjustment mode switching unit 20 determines whether or not the adjustment execution command Ct is off. If the adjustment execution command Ct is on (step S111: No), the flowchart reverts back to step S110, in which the manipulated-variable amplitude storage unit 25 outputs the adjustment manipulated-variable amplitude A. If, as described above, the calculation of the control gains is completed and the adjustment execution command Ct is off (step S111: Yes), the adjustment of the control gains ends.

Figure 5:
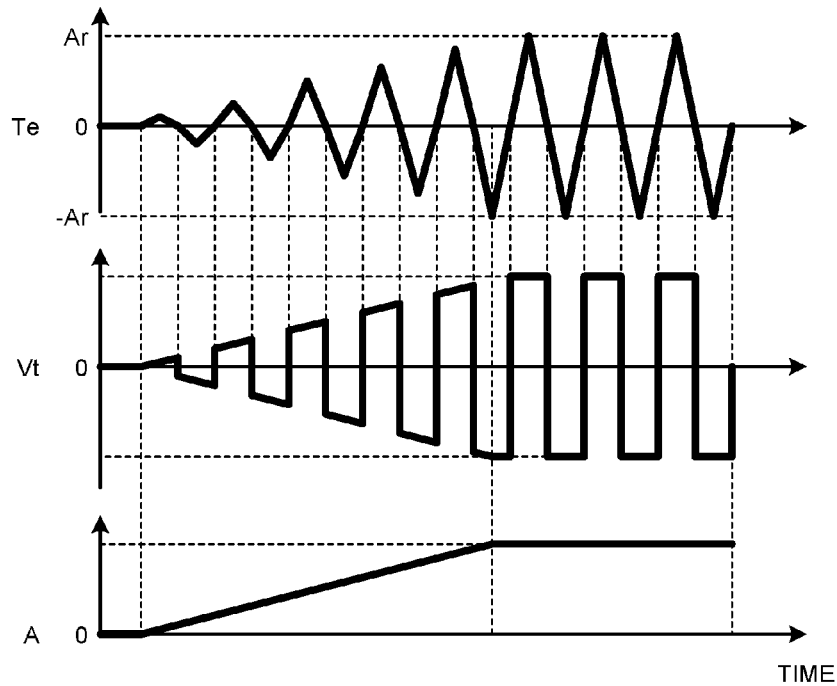
FIG. 5 is a diagram illustrating the behavior of the tension deviation Te and the adjustment manipulated variable Vt when the adjustment manipulated-variable amplitude A is increased in the first embodiment.

FIG. 5 is a diagram illustrating the behavior of the tension deviation Te and the adjustment manipulated variable Vt when the adjustment manipulated-variable amplitude A is increased by the procedure described above. As illustrated in FIG. 5, the adjustment manipulated variable Vt increases in amplitude in accordance with the elapsed time while reversing its sign every time the sign of the tension deviation Te is changed. As the adjustment manipulated-variable amplitude A increases, the amplitude of the tension deviation Te, which is its absolute value, increases. When the amplitude of the tension deviation Te becomes larger than the amplitude target value Ar, which is set by the amplitude target setting unit 16, the adjustment manipulated-variable amplitude A stops increasing.

Note that, although the tension detector 9 outputs the tension Tfb in the description above, the tension of the conveyed material 1 does not necessarily have to be detected. For example, a structure referred to as a dancer roller, which slides vertically or horizontally, may be provided in place of the tension detector 9; a predetermined external force may be exerted on the dancer roller such that the position of the dancer roller is the equivalence of the tension, and the position of the dancer roller may be detected by a displacement sensor. The description above can be applied as it is to a configuration that detects a quantity of state having an output that changes depending on the tension fluctuation of the conveyed material 1, that is, a configuration that detects a controlled variable, by replacing the tension command Tr, the tension Tfb, and the tension deviation Te, which are described above, with a controlled-variable command, the controlled variable, and a controlled-variable deviation.

To calculate the control gain accurately, it is necessary to generate a tension periodic vibration having an appropriate amplitude. Since the adjustment manipulated-variable amplitude A that achieves it is unknown, the adjustment manipulated-variable amplitude A is gradually increased until the tension periodic vibration achieves an appropriate amplitude in the first embodiment. If the adjustment manipulated-variable amplitude A is increased by an inappropriate method, a tension periodic vibration amplitude that has been set may not be achieved for a long time, which may result in failure of completing the adjustment of the control gain.

In contrast, the roller-to-roller conveyance control apparatus 100 according to the first embodiment can increase the adjustment manipulated-variable amplitude A appropriately until it achieves a tension periodic vibration amplitude that is suitable to calculate a tension gain, by increasing the adjustment manipulated-variable amplitude A reliably in accordance with the elapsed time. Hence, problems can be avoided such as a failure of completing the adjustment of the control gain due to the amplitude of the tension deviation Te failing to achieve an amplitude target for a long time.

Second Embodiment

A roller-to-roller conveyance control apparatus according to a second embodiment of the present invention has a configuration identical with that of the roller-to-roller conveyance control apparatus 100 according to the first embodiment in FIG. 1, except for the manipulated-variable amplitude determination unit 14.

Figure 6:
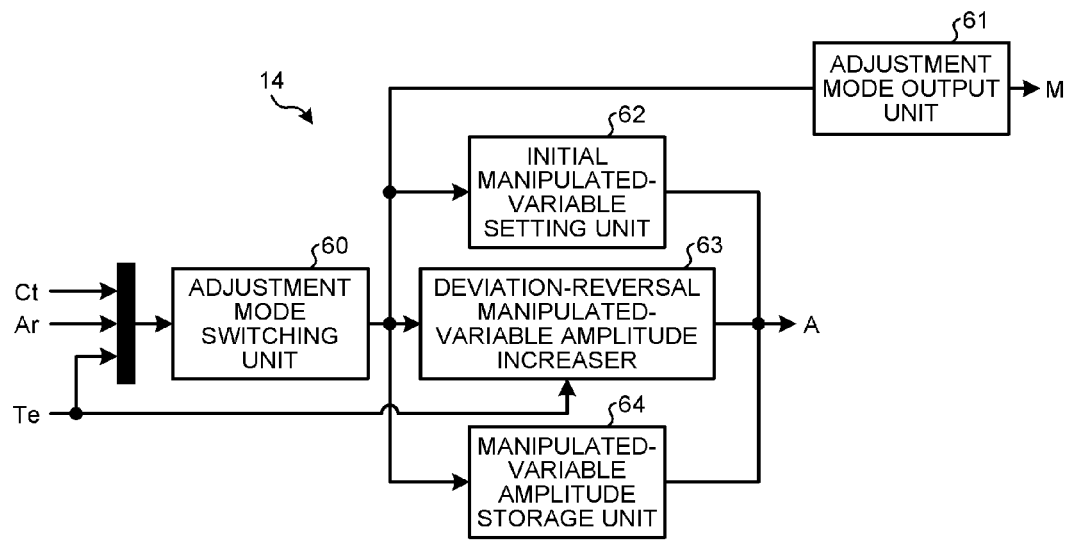
FIG. 6 is a block diagram of a manipulated-variable amplitude determination unit according to a second embodiment.

FIG. 6 is a block diagram illustrating the manipulated-variable amplitude determination unit 14 according to the second embodiment in detail. The manipulated-variable amplitude determination unit 14 according to the second embodiment includes an adjustment mode switching unit 60, which switches the adjustment mode M; an adjustment mode output unit 61, which outputs the adjustment mode M set by the adjustment mode switching unit 60 to the control-gain calculation device 12; an initial manipulated-variable setting unit 62, which sets an initial value of the adjustment manipulated-variable amplitude A; a deviation-reversal manipulated-variable amplitude increaser 63, which increases the adjustment manipulated-variable amplitude A when the sign of the tension deviation Te is reversed; and a manipulated-variable amplitude storage unit 64, which stores the adjustment manipulated-variable amplitude A. The initial manipulated-variable setting unit 62, the deviation-reversal manipulated-variable amplitude increaser 63, and the manipulated-variable amplitude storage unit 64 each output the adjustment manipulated-variable amplitude A, which is input to the adjustment manipulated-variable output unit 13.

Figure 7:
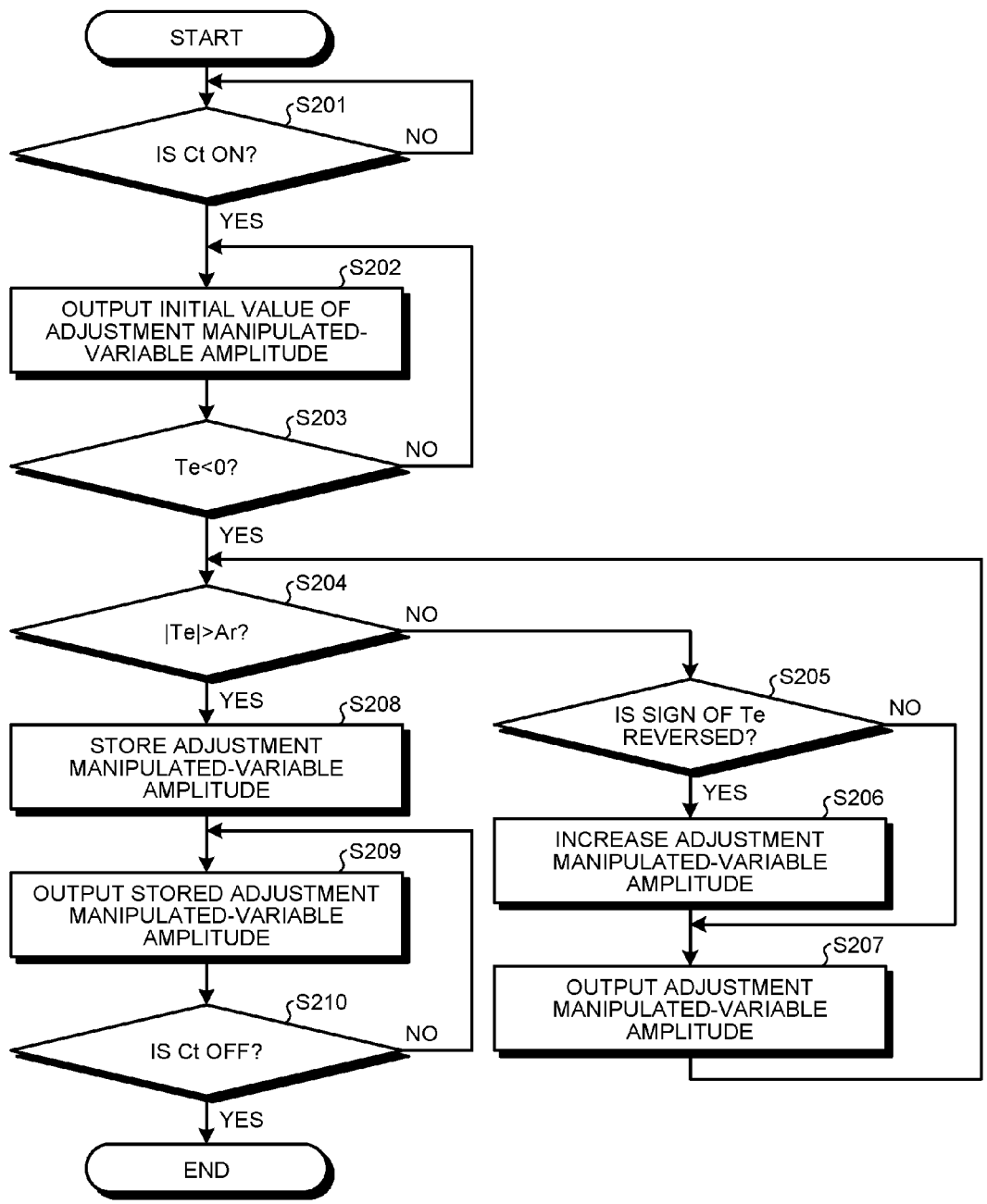
FIG. 7 is a flowchart illustrating a procedure to increase the adjustment manipulated-variable amplitude A according to the second embodiment.

The operation of the manipulated-variable amplitude determination unit 14 according to the second embodiment will now be described in detail with reference to FIGS. 1, 6, and 7. FIG. 7 is a flowchart illustrating a procedure to increase the adjustment manipulated-variable amplitude A according to the second embodiment.

In FIG. 1, the amplitude target setting unit 16 has the amplitude target value Ar of the tension periodic vibration, which is set for the calculation of the control gains. The adjustment execution command Ct, the tension deviation Te, and the amplitude target value Ar are input to the adjustment mode switching unit 60.

With reference to FIG. 7, in step S201, the adjustment mode switching unit 60 in FIG. 6 determines whether or not the adjustment execution command Ct is on. If it is determined that the adjustment execution command Ct is on (step S201: Yes), the adjustment mode switching unit 60 sets the mode 1 in the adjustment mode output unit 61; the flowchart proceeds to step S202. If the adjustment execution command Ct is not on (step S201: No), the determination in step S201 is performed again.

In step S202, the adjustment mode switching unit 60 selects the initial manipulated-variable setting unit 62. The initial manipulated-variable setting unit 62 outputs, as the adjustment manipulated-variable amplitude A, an initial value that has been set for the adjustment manipulated-variable amplitude to the adjustment manipulated-variable output unit 13. Here, at the time of the initial adjustment, the characteristics of the roller-to-roller conveyance control apparatus 100 are unknown; thus, an adjustment manipulated-variable amplitude that causes the motor to operate at a low speed is set in the initial manipulated-variable setting unit 62 as the initial value. This can prevent rupture of the conveyed material 1 and an overload on the machine.

After step S202, the flowchart proceeds to step S203. In step S203, the adjustment mode switching unit 60 determines whether or not the tension deviation Te is a negative value. If the tension deviation Te is a negative value (step S203: Yes), the adjustment mode switching unit 60 sets a mode 3 in the adjustment mode output unit 61; the flowchart proceeds to step S204. The mode 3 is a mode in which the adjustment manipulated-variable amplitude A is increased when the sign of the tension deviation Te changes. If the tension deviation Te is not a negative value (step S203: No), the flowchart reverts back to step S202.

In step S204, the adjustment mode switching unit 60 determines whether or not the absolute value of the tension deviation Te is larger than the amplitude target value Ar set by the amplitude target setting unit 16. If the absolute value of the tension deviation Te is larger than the amplitude target value Ar (step S204: Yes), the adjustment mode switching unit 60 sets the mode 4 in the adjustment mode output unit 61; the flowchart proceeds to step S208. If the absolute value of the tension deviation Te is smaller than the amplitude target value Ar (step S204: No), the flowchart proceeds to step S205.

In step S205, the adjustment mode switching unit 60 selects the deviation-reversal manipulated-variable amplitude increaser 63, and the deviation-reversal manipulated-variable amplitude increaser 63 determines whether or not the sign of the tension deviation Te is reversed. If the sign of the tension deviation Te is reversed (step S205: Yes), the flowchart proceeds to step S206. If the sign of the tension deviation Te is not reversed (step S205: No), the flowchart proceeds to step S207.

In step S206, the deviation-reversal manipulated-variable amplitude increaser 63 increases the adjustment manipulated-variable amplitude A. A specific method to increase the adjustment manipulated-variable amplitude A may be to have an amount of increase of the amplitude or a rate of increase of the amplitude, which is in either case predetermined for use when the sign of the tension deviation Te is reversed, and to determine the adjustment manipulated-variable amplitude A on the basis of the amount of increase of the amplitude or the rate of increase of the amplitude, whichever has been predetermined, when the sign of the tension deviation Te is reversed. In step S207, which is after step S206, the deviation-reversal manipulated-variable amplitude increaser 63 outputs the adjustment manipulated-variable amplitude A to the adjustment manipulated-variable output unit 13; the flowchart reverts back to step S204.

In step S208, the adjustment mode switching unit 60 selects the manipulated-variable amplitude storage unit 64, and the manipulated-variable amplitude storage unit 64 stores the adjustment manipulated-variable amplitude A that causes the absolute value of the tension deviation Te to become larger than the amplitude target value Ar for the first time. In step S209, which is after step S208, the manipulated-variable amplitude storage unit 64 outputs the stored adjustment manipulated-variable amplitude A to the adjustment manipulated-variable output unit 13.

The adjustment mode output unit 61 sends out the adjustment mode M that is selected by the adjustment mode switching unit 60 to the control-gain calculation device 12 in FIG. 1. As described above, if the absolute value of the tension deviation Te is larger than the amplitude target value Ar (step S204: Yes), the adjustment mode M is switched to the mode 4; thus, the control-gain calculation device 12 determines that the mode in which the control gains are calculated is present and starts measuring the amplitude and the vibration period of the tension deviation Te in order to calculate the control gains. Upon completion of the measurement of the amplitude and the vibration period of the tension deviation Te, the control-gain calculation device 12 calculates the control gains with the amplitude and the vibration period that have been measured. When the control-gain calculation device 12 completes the calculation of the control gains after the measurement, which continues until the tension deviation Te has vibrated the predetermined number of times, the adjustment execution command Ct is turned off. The operation of the control-gain calculation device 12 described here is separate from that of the manipulated-variable amplitude determination unit 14 and thus is not described in the flowchart in FIG. 7.

After step S209 in FIG. 7, the flowchart proceeds to step S210, in which the adjustment mode switching unit 60 determines whether or not the adjustment execution command Ct is off. If the adjustment execution command Ct is on (step S210: No), the flowchart reverts back to step S209, in which the manipulated-variable amplitude storage unit 64 outputs the adjustment manipulated-variable amplitude A. If, as described above, the calculation of the control gains is completed and the adjustment execution command Ct is off (step S210: Yes), the adjustment of the control gains ends.

Figure 8:
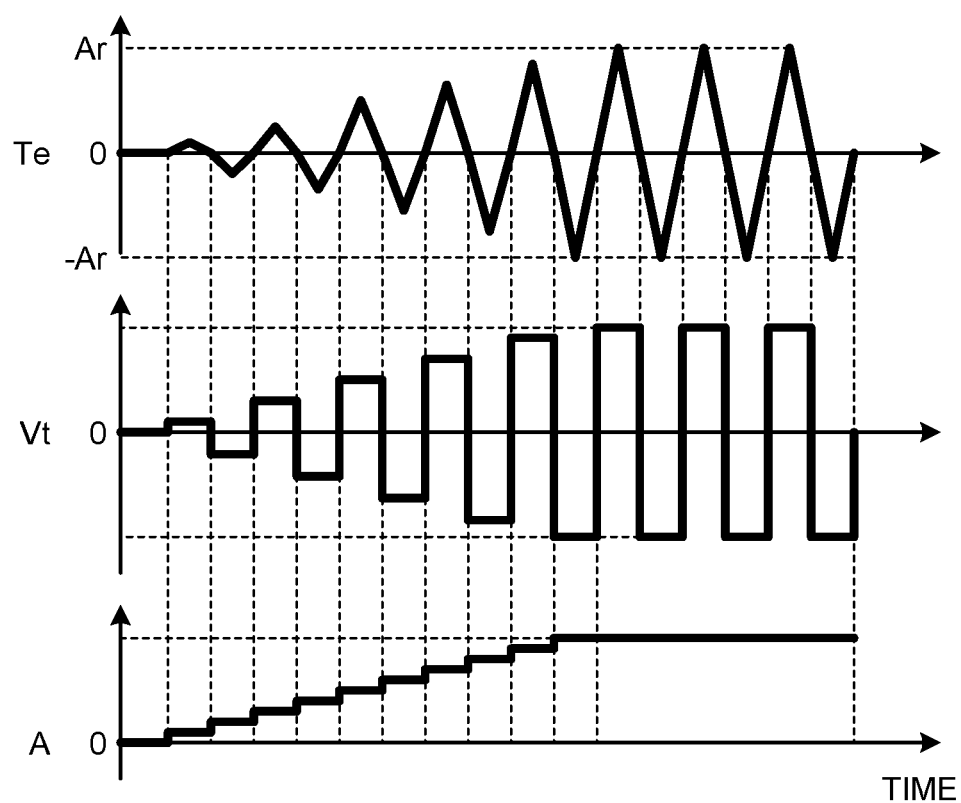
FIG. 8 is a diagram illustrating the behavior of the tension deviation Te and the adjustment manipulated variable Vt when the adjustment manipulated-variable amplitude A is increased in the second embodiment.

FIG. 8 is a diagram illustrating the behavior of the tension deviation Te and the adjustment manipulated variable Vt when the adjustment manipulated-variable amplitude A is increased by the procedure described above. As illustrated in FIG. 8, the adjustment manipulated variable Vt reverses its sign every time the sign of the tension deviation Te is changed, and increases in amplitude at every reversal. As the adjustment manipulated-variable amplitude A increases, the amplitude of the tension deviation Te, which is its absolute value, increases. When the amplitude of the tension deviation Te becomes larger than the amplitude target value Ar, which is set by the amplitude target setting unit 16, the adjustment manipulated-variable amplitude A stops increasing.

Note that, although the tension detector 9 outputs the tension Tfb in the description above, the tension of the conveyed material 1 does not necessarily have to be detected, as in the first embodiment. The position of a dancer roller may be detected by a displacement sensor.

In the second embodiment, the adjustment manipulated-variable amplitude A is also gradually increased until the tension periodic vibration achieves an appropriate amplitude. If the adjustment manipulated-variable amplitude A is increased by an inappropriate method, the amplitude of the tension periodic vibration may be increased excessively, which may result in rupture of the conveyed material 1 and an overload on the apparatus.

In contrast, the roller-to-roller conveyance control apparatus 100 according to the second embodiment increases the adjustment manipulated-variable amplitude A while verifying the change of the sign of the tension deviation Te; thus, the adjustment manipulated-variable amplitude A can be increased appropriately until it achieves a tension periodic vibration amplitude that is suitable to calculate the tension gains. Hence, the adjustment manipulated-variable amplitude A can be prevented from increasing more than necessary, and thus rupture of the conveyed material 1 and an overload on the apparatus can be avoided.

Third Embodiment

Figure 9:
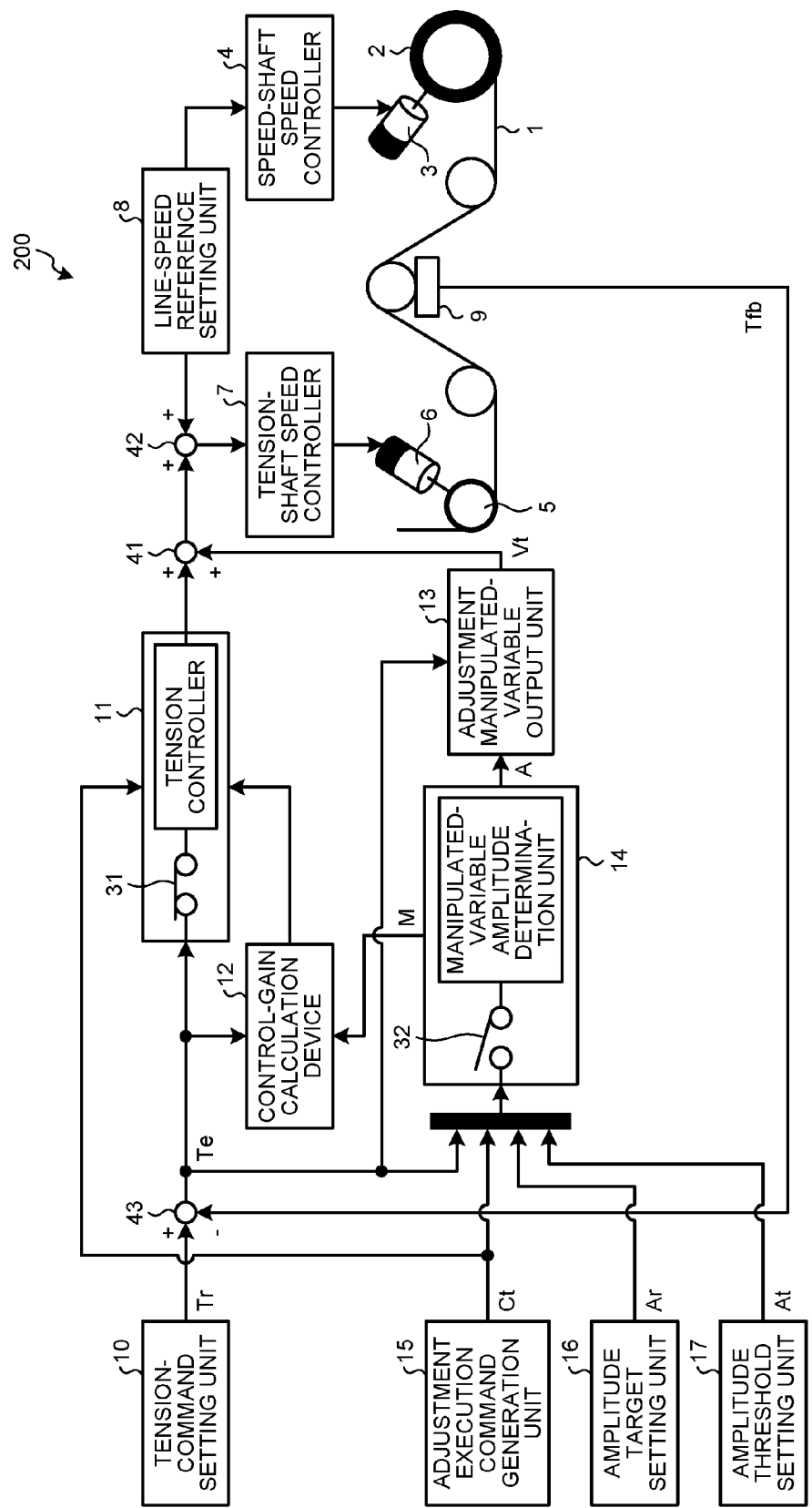
FIG. 9 is a block diagram illustrating an entire view of a roller-to-roller conveyance control apparatus according to a third embodiment.

FIG. 9 is a block diagram illustrating an entire view of a roller-to-roller conveyance control apparatus 200 according to a third embodiment of the present invention. The roller-to-roller conveyance control apparatus 200 in FIG. 9 has the configuration of the roller-to-roller conveyance control apparatus 100 in FIG. 1, with an addition of an amplitude threshold setting unit 17, which sets an amplitude threshold At of the tension periodic vibration for switching methods to increase the adjustment manipulated-variable amplitude. The amplitude threshold At is a value larger than zero and smaller than the amplitude target value Ar.

Figure 10:
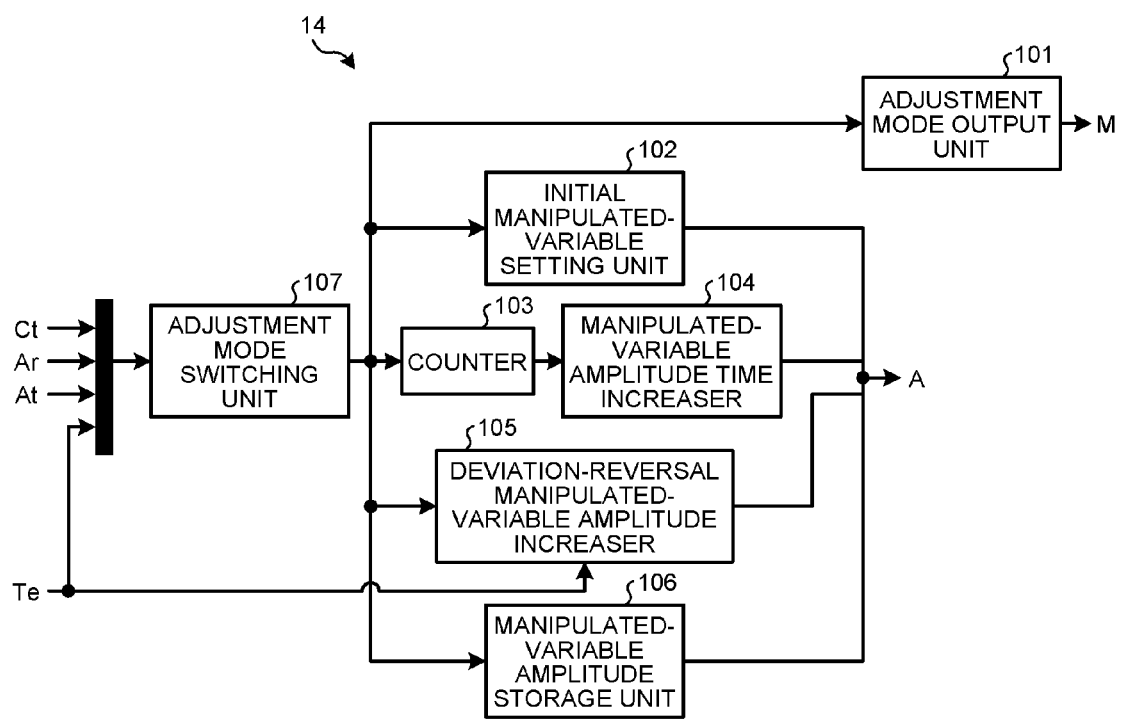
FIG. 10 is a block diagram of a manipulated-variable amplitude determination unit according to the third embodiment.

FIG. 10 is a block diagram illustrating in detail the manipulated-variable amplitude determination unit 14 in the roller-to-roller conveyance control apparatus 200 according to the third embodiment in FIG. 9. The manipulated-variable amplitude determination unit 14 according to the third embodiment includes an adjustment mode switching unit 107, which switches the adjustment mode M; an adjustment mode output unit 101, which outputs the adjustment mode M set by the adjustment mode switching unit 107 to the control-gain calculation device 12; an initial manipulated-variable setting unit 102, which sets an initial value of the adjustment manipulated-variable amplitude A; a counter 103, which counts the elapsed time; a manipulated-variable amplitude time increaser 104, which increases the adjustment manipulated-variable amplitude A in accordance with a counter value of the counter 103; a deviation-reversal manipulated-variable amplitude increaser 105, which increases the adjustment manipulated-variable amplitude A when the sign of the tension deviation Te is reversed; and a manipulated-variable amplitude storage unit 106, which stores the adjustment manipulated-variable amplitude A. The initial manipulated-variable setting unit 102, the manipulated-variable amplitude time increaser 104, the deviation-reversal manipulated-variable amplitude increaser 105, and the manipulated-variable amplitude storage unit 106 each output the adjustment manipulated-variable amplitude A, which is input to the adjustment manipulated-variable output unit 13.

Figure 11:
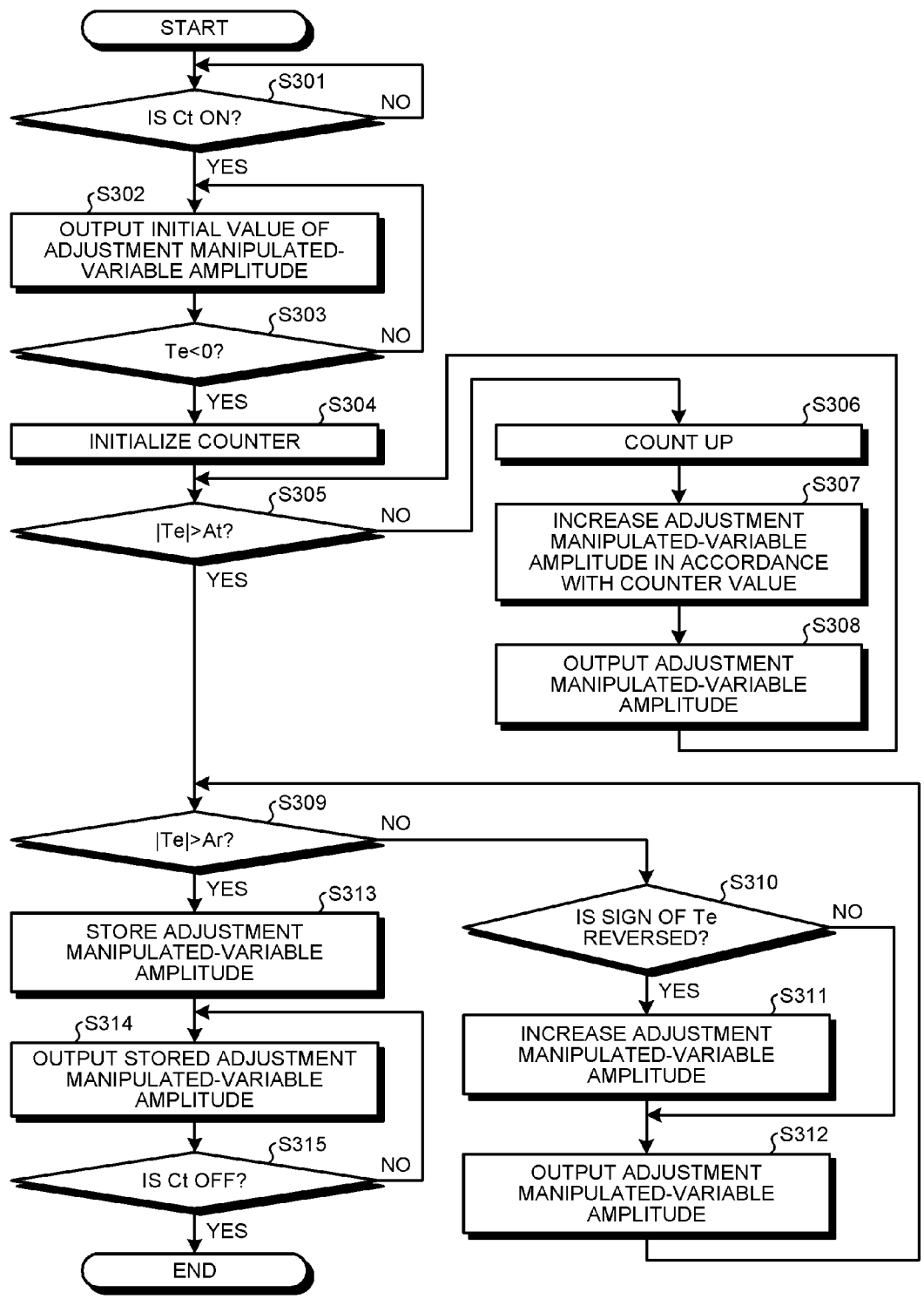
FIG. 11 is a flowchart illustrating a procedure to increase the adjustment manipulated-variable amplitude A according to the third embodiment.

The operation of the manipulated-variable amplitude determination unit 14 according to the third embodiment will now be described in detail with reference to FIGS. 9, 10, and 11. FIG. 11 is a flowchart illustrating a procedure to increase the adjustment manipulated-variable amplitude A according to the third embodiment.

In FIG. 9, the amplitude threshold setting unit 17 has the amplitude threshold At of the tension deviation Te, which is set for switching between the mode 2 and the mode 3. The amplitude target setting unit 16 has the amplitude target value Ar of the tension periodic vibration, which is set for the calculation of the control gains. The adjustment execution command Ct, the tension deviation Te, the amplitude threshold At, and the amplitude target value Ar are input to the adjustment mode switching unit 107.

With reference to FIG. 11, in step S301, the adjustment mode switching unit 107 in FIG. 10 determines whether or not the adjustment execution command Ct is on. If it is determined that the adjustment execution command is on (step S301: Yes), the adjustment mode switching unit 107 sets the mode 1 in the adjustment mode output unit 101; the flowchart proceeds to step S302. If the adjustment execution command Ct is not on (step S301: No), the determination in step S301 is performed again.

In step S302, the adjustment mode switching unit 107 selects the initial manipulated-variable setting unit 102. The initial manipulated-variable setting unit 102 outputs, as the adjustment manipulated-variable amplitude A, an initial value that has been set for the adjustment manipulated-variable amplitude to the adjustment manipulated-variable output unit 13. Here, at the time of the initial adjustment, the characteristics of the roller-to-roller conveyance control apparatus 200 are unknown; thus, an adjustment manipulated-variable amplitude that causes the motor to operate at a low speed is set in the initial manipulated-variable setting unit 102 as the initial value. This can prevent rupture of the conveyed material 1 and an overload on the machine.

After step S302, the flowchart proceeds to step S303. In step S303, the adjustment mode switching unit 107 determines whether or not the tension deviation Te is a negative value. If the tension deviation Te is a negative value (step S303: Yes), the adjustment mode switching unit 107 sets the mode 2 in the adjustment mode output unit 101; the flowchart proceeds to step S304. The mode 2 is a mode in which the adjustment manipulated-variable amplitude A is increased in accordance with the elapsed time. If the tension deviation Te is not a negative value (step S303: No), the flowchart reverts back to step S302.

In step S304, the adjustment mode switching unit 107 initializes the counter 103. After step S304, the flowchart proceeds to step S305. In step S305, the adjustment mode switching unit 107 determines whether or not the absolute value of the tension deviation Te is larger than the amplitude threshold At set by the amplitude threshold setting unit 17. If the absolute value of the tension deviation Te is larger than the amplitude threshold At (step S305: Yes), the adjustment mode switching unit 107 sets the mode 3 in the adjustment mode output unit 101; the flowchart proceeds to step S309. If the absolute value of the tension deviation Te is smaller than the amplitude threshold At (step S305: No), the flowchart proceeds to step S306.

In step S306, the adjustment mode switching unit 107 selects the counter 103, and the counter 103 counts up in accordance with the elapsed time. In step S307, which is after step S306, the manipulated-variable amplitude time increaser 104 increases the adjustment manipulated-variable amplitude A in accordance with a counter value of the counter 103. A specific method to increase the adjustment manipulated-variable amplitude A may be to have an amount of increase of the amplitude or a rate of increase of the amplitude, which is in either case predetermined per unit time, and to determine the adjustment manipulated-variable amplitude A on the basis of the amount of increase of the amplitude or the rate of increase of the amplitude, whichever has been predetermined, in accordance with the elapsed time counted by the counter 103. In step S308, which is after step S307, the manipulated-variable amplitude time increaser 104 outputs the adjustment manipulated-variable amplitude A to the adjustment manipulated-variable output unit 13; the flowchart reverts back to step S305.

In step S309, the adjustment mode switching unit 107 determines whether or not the absolute value of the tension deviation Te is larger than the amplitude target value Ar set in the amplitude target setting unit 16. If the absolute value of the tension deviation Te is larger than the amplitude target value Ar (step S309: Yes), the adjustment mode switching unit 107 sets the mode 4 in the adjustment mode output unit 101; the flowchart proceeds to step S313. If the absolute value of the tension deviation Te is smaller than the amplitude target value Ar (step S309: No), the flowchart proceeds to step S310.

In step S310, the adjustment mode switching unit 107 selects the deviation-reversal manipulated-variable amplitude increaser 105, and the deviation-reversal manipulated-variable amplitude increaser 105 determines whether or not the sign of the tension deviation Te is reversed. If the sign of the tension deviation Te is reversed (step S310: Yes), the flowchart proceeds to step S311. If the sign of the tension deviation Te is not reversed (step S310: No), the flowchart proceeds to step S312.

In step S311, the deviation-reversal manipulated-variable amplitude increaser 105 increases the adjustment manipulated-variable amplitude A. A specific method to increase the adjustment manipulated-variable amplitude A may be to have an amount of increase of the amplitude or a rate of increase of the amplitude, which is in either case predetermined for use when the sign of the tension deviation Te is reversed, and to determine the adjust manipulated-variable amplitude A on the basis of the amount of increase of the amplitude or the rate of increase of the amplitude, whichever has been predetermined, when the sign of the tension deviation Te is reversed. In step S312, which is after step S311, the deviation-reversal manipulated-variable amplitude increaser 105 outputs the adjustment manipulated-variable amplitude A to the adjustment manipulated-variable output unit 13; the flowchart reverts back to step S309.

In step S313, the adjustment mode switching unit 107 selects the manipulated-variable amplitude storage unit 106, and the manipulated-variable amplitude storage unit 106 stores the adjustment manipulated-variable amplitude A that causes the absolute value of the tension deviation Te to become larger than the amplitude target value Ar for the first time. In step S314, which is after step S313, the manipulated-variable amplitude storage unit 106 outputs the stored adjustment manipulated-variable amplitude A to the adjustment manipulated-variable output unit 13.

The adjustment mode output unit 101 sends out the adjustment mode M that is selected by the adjustment mode switching unit 107 to the control-gain calculation device 12 in FIG. 9. As described above, if the absolute value of the tension deviation Te is larger than the amplitude target value Ar (step S309: Yes), the adjustment mode M is switched to the mode 4; thus, the control-gain calculation device 12 determines that the mode in which the control gains are calculated is present and starts measuring the amplitude and the vibration period of the tension deviation Te in order to calculate the control gains. Upon completion of the measurement of the amplitude and the vibration period of the tension deviation Te, the control-gain calculation device 12 calculates the control gains with the amplitude and the vibration period that have been measured. When the control-gain calculation device 12 completes the calculation of the control gains after the measurement, which continues until the tension deviation Te has vibrated the predetermined number of times, the adjustment execution command Ct is turned off. The operation of the control-gain calculation device 12 described here is separate from that of the manipulated-variable amplitude determination unit 14 and thus is not described in the flowchart in FIG. 11.

After step S314 in FIG. 11, the flowchart proceeds to step S315, in which the adjustment mode switching unit 107 determines whether or not the adjustment execution command Ct is off. If the adjustment execution command Ct is on (step S315: No), the flowchart reverts back to step S314, in which the manipulated-variable amplitude storage unit 106 outputs the adjustment manipulated-variable amplitude A. If, as described above, the calculation of the control gains is completed and the adjustment execution command Ct is off (step S315: Yes), the adjustment of the control gains ends.

Note that, although the tension detector 9 outputs the tension Tfb in the description above, the tension of the conveyed material 1 does not necessarily have to be detected, as in the first and second embodiments. The position of a dancer roller may be detected by a displacement sensor.

As described above, the roller-to-roller conveyance control apparatus 200 according to the third embodiment increases the adjustment manipulated-variable amplitude A in accordance with the elapsed time in the first half of the process of increasing the adjustment manipulated-variable amplitude A; thus, problems can be avoided such as a failure of completing the adjustment of the control gain due to the amplitude of the tension deviation Te failing to achieve an amplitude target for a long time. The roller-to-roller conveyance control apparatus 200 according to the third embodiment increases the adjustment manipulated-variable amplitude A while verifying the change of the sign of the tension deviation Te in the latter half of the process of increasing the adjustment manipulated-variable amplitude A; hence, the adjustment manipulated-variable amplitude A can be prevented from increasing more than necessary, and thus rupture of the conveyed material 1 and an overload on the device can be avoided.

The configurations illustrated in the embodiments described above are examples of the content of the present invention. Combination with other publicly known techniques is possible, and omitting or changing a part of the configurations is also possible without departing from the spirit of the present invention.

REFERENCE SIGNS LIST 1 conveyed material, 2 winding roller, 3 winding motor, 4 speed-shaft speed controller, 5 unwinding roller, 6 unwinding motor, 7 tension-shaft speed controller, 8 line-speed reference setting unit, 9 tension detector, 10 tension-command setting unit, 11 tension controller, 12 control-gain calculation device, 13 adjustment manipulated-variable output unit, 14 manipulated-variable amplitude determination unit, 15 adjustment execution command generation unit, 16 amplitude target setting unit, 17 amplitude threshold setting unit, 20, 60, and 107 adjustment mode switching unit, 21, 61, and 101 adjustment mode output unit, 22, 62, and 102 initial manipulated-variable setting unit, 23 and 103 counter, 24 and 104 manipulated-variable amplitude time increaser, 25, 64, and 106 manipulated-variable amplitude storage unit, 31 and 32 switch, 41 and 42 adder, 43 subtracter, 63 and 105 deviation-reversal manipulated-variable amplitude increaser, 100 and 200 roller-to-roller conveyance control apparatus.

The invention claimed is:

1. A roller-to-roller conveyance control apparatus that comprises:
a speed-shaft roller that is driven by a speed-control-shaft motor;
a tension-shaft roller that is driven by a tension-control-shaft motor;
a tension detector that detects a tension of a conveyed material that is conveyed between the speed-shaft roller and the tension-shaft roller;
a line-speed reference setting unit that sets a line speed reference for the conveyed material;
a tension-command setting unit that sets a tension command for the conveyed material;
a tension controller that calculates a tension control correction command on a basis of a control gain and a tension deviation that is a difference between the tension command and the tension;
a speed-shaft speed controller that controls the speed-control-shaft motor on a basis of the line speed reference; and
a tension-shaft speed controller that controls the tension-control-shaft motor on a basis of the line speed reference and the tension control correction command,
the roller-to-roller conveyance control apparatus comprising:
an amplitude target setting unit that sets an amplitude target value of the tension deviation;
an adjustment execution command generation unit that provides a command to adjust or not to adjust the control gain;
an adjustment manipulated-variable output unit that outputs an adjustment manipulated variable in such a manner that a sign of the adjustment manipulated variable is reversed on a basis of a sign of the tension deviation during adjustment of the control gain;
a manipulated-variable amplitude determination unit that increases an amplitude of the adjustment manipulated variable until an amplitude of the tension deviation becomes larger than the amplitude target value during adjustment of the control gain; and
a control-gain calculation device that calculates the control gain from the amplitude and a vibration period of the tension deviation during adjustment of the control gain, wherein
the tension-shaft speed controller controls the tension-control-shaft motor on a basis of the line speed reference and the adjustment manipulated variable during adjustment of the control gain.

2. The roller-to-roller conveyance control apparatus according to claim 1, wherein the manipulated-variable amplitude determination unit increases the amplitude of the adjustment manipulated variable linearly in relation to an elapsed time and causes the amplitude of the adjustment manipulated variable to be a constant value after the amplitude of the tension deviation becomes larger than the amplitude target value.

3. The roller-to-roller conveyance control apparatus according to claim 1,
wherein the tension-shaft speed controller controls the tension-control-shaft motor such that a rotational speed of the tension-control-shaft motor agrees with a rotational speed based on a sum of the line speed reference and the adjustment manipulated variable that increases in amplitude until the amplitude of the tension deviation becomes larger than the amplitude target value during adjustment of the control gain.

4. A roller-to-roller conveyance control apparatus that comprises:
a speed-shaft roller that is driven by a speed-control-shaft motor;
a tension-shaft roller that is driven by a tension-control-shaft motor;
a tension detector that detects a tension of a conveyed material that is conveyed between the speed-shaft roller and the tension-shaft roller;
a line-speed reference setting unit that sets a line speed reference for the conveyed material;
a tension-command setting unit that sets a tension command for the conveyed material;
a tension controller that calculates a tension control correction command on a basis of a control gain and a tension deviation that is a difference between the tension command and the tension;
a speed-shaft speed controller that controls the speed-control-shaft motor on a basis of the line speed reference; and
a tension-shaft speed controller that controls the tension-control-shaft motor on a basis of the line speed reference and the tension control correction command,
the roller-to-roller conveyance control apparatus comprising:
an amplitude target setting unit that sets an amplitude target value of the tension deviation;
an adjustment execution command generation unit that provides a command to adjust or not to adjust the control gain;
an adjustment manipulated-variable output unit that outputs an adjustment manipulated variable on a basis of the tension deviation during adjustment of the control gain;
a manipulated-variable amplitude determination unit that increases an amplitude of the adjustment manipulated variable until an amplitude of the tension deviation becomes larger than the amplitude target value during adjustment of the control gain;
a control-gain calculation device that calculates the control gain from the amplitude and a vibration period of the tension deviation during adjustment of the control gain; and
an amplitude threshold setting unit that sets an amplitude threshold that is smaller than the amplitude target value, wherein
the manipulated-variable amplitude determination unit increases the amplitude of the adjustment manipulated variable linearly in relation to an elapsed time when the amplitude of the tension deviation is smaller than the amplitude threshold, increases the amplitude of the adjustment manipulated variable every time a sign of the tension deviation changes when the amplitude of the tension deviation is larger than the amplitude threshold and is smaller than the amplitude target value, and causes the amplitude of the adjustment manipulated variable to be a constant value after the amplitude of the tension deviation becomes larger than the amplitude target value, and
the tension-shaft speed controller controls the tension-control-shaft motor on a basis of the line speed reference and the adjustment manipulated variable during adjustment of the control gain.

5. The roller-to-roller conveyance control apparatus according to claim 4, wherein the tension-shaft speed controller controls the tension-control-shaft motor such that a rotational speed of the tension-control-shaft motor agrees with a rotational speed based on a sum of the line speed reference and the adjustment manipulated variable that increases in amplitude until the amplitude of the tension deviation becomes larger than the amplitude target value during adjustment of the control gain.

6. A roller-to-roller conveyance control apparatus that comprises:
a speed-shaft roller that is driven by a speed-control-shaft motor;
a tension-shaft roller that is driven by a tension-control-shaft motor;
a tension detector that detects a tension of a conveyed material that is conveyed between the speed-shaft roller and the tension-shaft roller;
a line-speed reference setting unit that sets a line speed reference for the conveyed material;
a tension-command setting unit that sets a tension command for the conveyed material;
a tension controller that calculates a tension control correction command on a basis of a control gain and a tension deviation that is a difference between the tension command and the tension;
a speed-shaft speed controller that controls the speed-control-shaft motor on a basis of the line speed reference; and
a tension-shaft speed controller that controls the tension-control-shaft motor on a basis of the line speed reference and the tension control correction command,
the roller-to-roller conveyance control apparatus comprising:
an amplitude target setting unit that sets an amplitude target value of the tension deviation;
an adjustment execution command generation unit that provides a command to adjust or not to adjust the control gain;
an adjustment manipulated-variable output unit that outputs an adjustment manipulated variable on a basis of the tension deviation during adjustment of the control gain;
a manipulated-variable amplitude determination unit that increases an amplitude of the adjustment manipulated variable until an amplitude of the tension deviation becomes larger than the amplitude target value during adjustment of the control gain; and
a control-gain calculation device that calculates the control gain from the amplitude and a vibration period of the tension deviation during adjustment of the control gain, wherein
the manipulated-variable amplitude determination unit increases the amplitude of the adjustment manipulated variable every time a sign of the tension deviation changes, and causes the amplitude of the adjustment manipulated variable to be a constant value after the amplitude of the tension deviation becomes larger than the amplitude target value, and
the tension-shaft speed controller controls the tension-control-shaft motor on a basis of the line speed reference and the adjustment manipulated variable during adjustment of the control gain.

7. The roller-to-roller conveyance control apparatus according to claim 6, wherein the tension-shaft speed controller controls the tension-control-shaft motor such that a rotational speed of the tension-control-shaft motor agrees with a rotational speed based on a sum of the line speed reference and the adjustment manipulated variable that increases in amplitude until the amplitude of the tension deviation becomes larger than the amplitude target value during adjustment of the control gain.

* * * * *